(12) United States Patent
Haddock

(10) Patent No.: US 7,140,540 B2
(45) Date of Patent: Nov. 28, 2006

(54) METHOD OF MAKING SECURE PERSONAL DATA CARD

(75) Inventor: Richard M. Haddock, Redwood City, CA (US)

(73) Assignee: Lasercard Corporation, Mountain View, CA (US)

( * ) Notice: Subject to any disclaimer, the term of this patent is extended or adjusted under 35 U.S.C. 154(b) by 51 days.

(21) Appl. No.: 10/434,253

(22) Filed: May 7, 2003

(65) Prior Publication Data

US 2004/0245346 A1 Dec. 9, 2004

Related U.S. Application Data

(60) Provisional application No. 60/379,073, filed on May 8, 2002.

(51) Int. Cl.
  *G06K 5/00* (2006.01)
(52) U.S. Cl. ........................ 235/380; 235/492
(58) Field of Classification Search ............... 235/380, 235/487–493; 438/106–115, 460, 464, 458; 361/737
  See application file for complete search history.

(56) References Cited

U.S. PATENT DOCUMENTS

| | | | | |
|---|---|---|---|---|
| 3,689,991 A | | 9/1972 | Aird ............................. 29/577 |
| 4,055,833 A | * | 10/1977 | Rothfjell ..................... 382/118 |
| 4,230,939 A | | 10/1980 | de Bont et al. ............. 235/488 |
| 4,269,917 A | | 5/1981 | Drexler et al. ................ 430/16 |
| 4,278,756 A | | 7/1981 | Bouldin et al. ............. 430/414 |
| 4,278,758 A | | 7/1981 | Drexler et al. .............. 430/616 |
| 4,298,684 A | | 11/1981 | Bouldin et al. ............. 430/616 |
| 4,314,260 A | | 2/1982 | Drexler ..................... 346/76 L |
| 4,463,971 A | | 8/1984 | Hoppe et al. ................. 283/83 |
| 4,474,292 A | | 10/1984 | Haghiri-Tehrani et al. .. 206/329 |
| 4,680,459 A | | 7/1987 | Drexler ....................... 235/487 |
| 4,701,236 A | | 10/1987 | Vieilledent .................. 156/252 |
| 4,814,594 A | | 3/1989 | Drexler ....................... 235/487 |
| 5,042,145 A | | 8/1991 | Boucquet ...................... 29/840 |
| 5,397,426 A | * | 3/1995 | Nioche et al. .............. 156/514 |
| 5,421,619 A | | 6/1995 | Dyball ......................... 283/86 |

(Continued)

FOREIGN PATENT DOCUMENTS

WO    WO 01/43066 A1    6/2001

OTHER PUBLICATIONS

E. Lorincz et al., "Read/Write Demonstrator of Rewritable Holographic Memory Card System", 8 pages, no date.

(Continued)

*Primary Examiner*—Jared J. Fureman
*Assistant Examiner*—Kumiko C. Koyama
(74) *Attorney, Agent, or Firm*—Schneck & Schneck; Thomas Schneck

(57) ABSTRACT

A method for the automated manufacture of personal optical security cards utilizing commercial equipment known in the art for creating integrated circuit chip cards, also known as smart cards. A cavity is milled in a card body. An optical security chip carrier is loaded onto the smart card manufacturing machine and the milled card is fed into the machine. The optical security chip carrier uses the same layout and spacing as an integrated circuit carrier chin so that the optical carrier may be loaded onto the machine. The optical security chip is removed, for example, by being punched out from the optical security chip carrier, and is embedded within the card cavity with the smart card manufacturing machine. Optical data and graphical elements may be recorded on the optical security chip and/or card body to personalize the card and to decrease the possibility of fraud.

26 Claims, 4 Drawing Sheets

U.S. PATENT DOCUMENTS

| | | | |
|---|---|---|---|
| 5,671,525 A * | 9/1997 | Fidalgo | 29/600 |
| 5,763,868 A * | 6/1998 | Kubota et al. | 235/487 |
| 5,932,870 A * | 8/1999 | Berson | 235/494 |
| 6,036,797 A | 3/2000 | Kanazawa et al. | 156/82 |
| 6,089,460 A * | 7/2000 | Hazama | 235/492 |
| 6,283,368 B1 * | 9/2001 | Ormerod et al. | 235/380 |
| 6,290,130 B1 | 9/2001 | Drexler | |
| 6,293,470 B1 | 9/2001 | Asplund | 235/487 |
| 6,297,075 B1 * | 10/2001 | Odajima et al. | 438/110 |
| 6,303,471 B1 * | 10/2001 | Unno et al. | 438/464 |
| 6,305,609 B1 | 10/2001 | Melzer et al. | 235/487 |
| 6,337,752 B1 | 1/2002 | Heckenkamp et al. | |
| 6,519,497 B1 * | 2/2003 | Blome et al. | 700/58 |
| 6,696,022 B1 * | 2/2004 | Chan et al. | 422/99 |
| 2002/0016020 A1 * | 2/2002 | Usami | 438/106 |

OTHER PUBLICATIONS

LaserCard Systems Corporation brochure, "LaserCard®: The Secure ID Document", Apr. 2002.

LaserCard Systems Corporation brochure, LaserCard® Application Spotlight, "Border Crossing/ Immigration ID Cards", no date.

SmartCard Handbook, W. Rankl & W. Effing, "Smart Card Manufacturing", 1997, pp. 293-306.

Y. Haghiri & T. Tarantino, "Smart Card Manufacturing—A Practical Guide", 2002, pp. 1-221.

* cited by examiner

METHOD OF MAKING SECURE PERSONAL DATA CARD

CROSS-REFERENCE TO RELATED APPLICATION

This application claims priority from U.S. provisional application No. 60/379,073, filed May 8, 2002, which is hereby incorporated by reference.

TECHNICAL FIELD

The invention relates to personal data cards and, in particular, to optical security cards and the production of such cards.

BACKGROUND ART

In the field of security documents, the need to add layers of secure elements to cards, passports and other identification documents and materials is increasing. Recent improvements in the state of the art to reproduce images of the actual document owner in the document material itself include the use of "embedded holograms" in optical memory cards, personalized laser perforation of documents and plastic cards, and the generation of personalized holographic images in plastic overlay materials. U.S. Pat. Nos. 4,680,459; 4,814,594 and 5,421,619, assigned to the assignee of the present invention and hereby incorporated by reference, describe the creation of laser recorded data in optical memory cards.

Special emphasis is given to international secure documents in having what is known as a "personalized optically variable device having diffractive characteristics". There is a need for a simpler and more secure method of generating and applying an optically variable device containing personalized data, for application on cards and other secure documents. Secure identification documents need the ability to securely link the cardholder to the token document, such as an identification card or driver's license. Much forgery and counterfeiting is aimed at either altering the existing printed face image on a card, or counterfeiting such cards from scratch using existing materials.

Much progress has been made to make such attempts more difficult, by the addition of other elements and features on the document to reproduce the same image of the rightful cardholder's image in alternate materials. These materials are chosen to be difficult to procure or replicate to resist counterfeiting, and should be done in a permanent, unalterable process such that the image cannot be changed by forgery.

One example of such a secure identification card system is the use of an "embedded hologram" utilized on optical memory cards. In this system, the printed image of the cardholders is converted into a bitmapped image file that is written into the optical media data tracks by a low power semiconductor laser in the optical head of the optical card reader/writer device. The reader/writer changes the encoding format to then also write the digital files containing the cardholder image information into remaining open data tracks on the same optical card media surface. This system therefore provides both eye-visible and computer readable versions of the cardholder's personalized image printed on the surface of the document, providing excellent enhanced document security.

Although the existing optical card based "embedded hologram" technique provides an excellent feature of an optical card, it requires the use of a specifically constructed optical card and optical card reader/writer encoder unit. Both the card and reader/writer unit are intended for high-speed random access digital data recording as their primary purpose; the embedded hologram feature is an add-on to these standard products.

The resulting standard system therefore has significant limitation on cost and flexibility, when the primary object is the insertion of only an embedded hologram optical feature into a card or document.

Automated standard systems for producing integrated circuit cards, also known as smart cards, are known in the art. Smart cards contain an integrated circuit device or chip within the card that may be placed in data communication within a smart card reader. An example of a company that employs an automated standard system for producing smart cards is Mühlbauer AG. Such a system is cost efficient and allows for the mass production of smart cards. Smart card manufacturing is described in detail in "Smart Card Manufacturing A Practical Guide". Yahya Haghiri & Thomas Tarantino, Smart Card Manufacturing A Practical Guide (John Wiley & Sons, Ltd 2002)(1999)).

It is an object of the present invention to provide an improved method for manufacturing an optical security card having an optical security chip.

It is another object of the present invention to provide a method for enhancing the security of optical security cards.

SUMMARY OF INVENTION

The method of the present invention utilizes known commercial smart card manufacturing equipment of the type used for embedding an integrated circuit chip within a card to create a personal optical security card of the present invention. The optical security card of the present invention includes a personal optical security chip, not an integrated circuit chip, that is derived from formatted optical security chip areas on a carrier comprising tape, film, optical or other material. The optical security chip areas may be defined by recordings on the optical media or may be defined when an optical security chip is bonded to the optical medium. The optical security chip carrier utilizes the same layout and spacing that is used with integrated circuit chip carriers used in commercial smart card chip embedding manufacturing equipment. Typically, the optical security chip carrier is 35 mm wide so that it can be used with existing smart card manufacturing equipment. The optical security chip carrier is loaded onto a commercial smart card manufacturing machine to create a personal optical security card.

The optical security chips may include a continuous roll stock of optical media having secure optical security chip areas pre-formatted or pre-defined thereon, with for example, recordings. In one embodiment the optical media stock remains blank and the chips are punched out from the blank stock. Alternatively, an optical chip may be bonded to a carrier using methods known in the art for bonding an integrated circuit module to a carrier.

The optical security chip areas are removed from or punched out of the optical chip carrier using the smart card punching/embedding machine known in the art. The optical chip size is typically the same size as a normal smart card integrated circuit chip, for example, about 1.5 cm by 1 cm. Each punched optical chip is inserted into a pre-milled cavity in a card body, and attached using normal integrated circuit chip adhesive systems and commercial smart card manufacturing equipment known in the art. The method of the present invention will allow the implementation of the personal optical security card using normal commercially available smart card facilities, and allow the insertion of the optical security chip into any normal plastic card blank. This eliminates the need for a custom made optical card body to contain the optical security chip element, and increases the card body and feature set into which a personal optical security chip may be used.

The personal optical security chip may include digital and/or eye readable recordings recorded on the chip before and/or after insertion of the chip into the cavity of the card. Additionally, the card itself may include digital and/or eye readable recordings recorded on the card before and/or after insertion of the chip into the cavity of the card.

The layout of each personal optical security chip may contain high-resolution graphical elements to clearly mark each customer's optical security chip as a unique product. The high-resolution graphical elements are implemented at graphic resolutions beyond the means of normal printing techniques.

The optical security chip contains reference marks to allow the use of modified optical card reader/writer systems to write an embedded hologram within an optical window of the optical security chip framed by the surrounding security graphical elements, after the optical chip has been inserted into the card body. A laser may be used to record personalized data by using 1 to 10 micron pits inside the optical window area. The data may be interlinked with surrounding high-resolution graphical patterns, giving the personalization feature difficult to duplicate diffractive characteristics.

Optionally, the personal optical security chip may have text and other graphics encoded into the optical security chip, to provide visible card serial numbers and/or cardholder identification information.

Optionally, the personal optical security chip may have a region suitable for the recording of machine-readable optical data to further augment the value of the system.

Further, the card can support insertion of an integrated circuit chip within a second card cavity, in addition to the optical security chip.

For cards having integrated circuit chips, the overall card security can be enhanced by adding the integrated circuit chip identification numbers into the visible and/or machine readable portions of the personal optical security chip and/or card, thus protecting the card against integrated circuit chip module swapping.

DETAILED DESCRIPTION OF THE INVENTION

Figure 1:
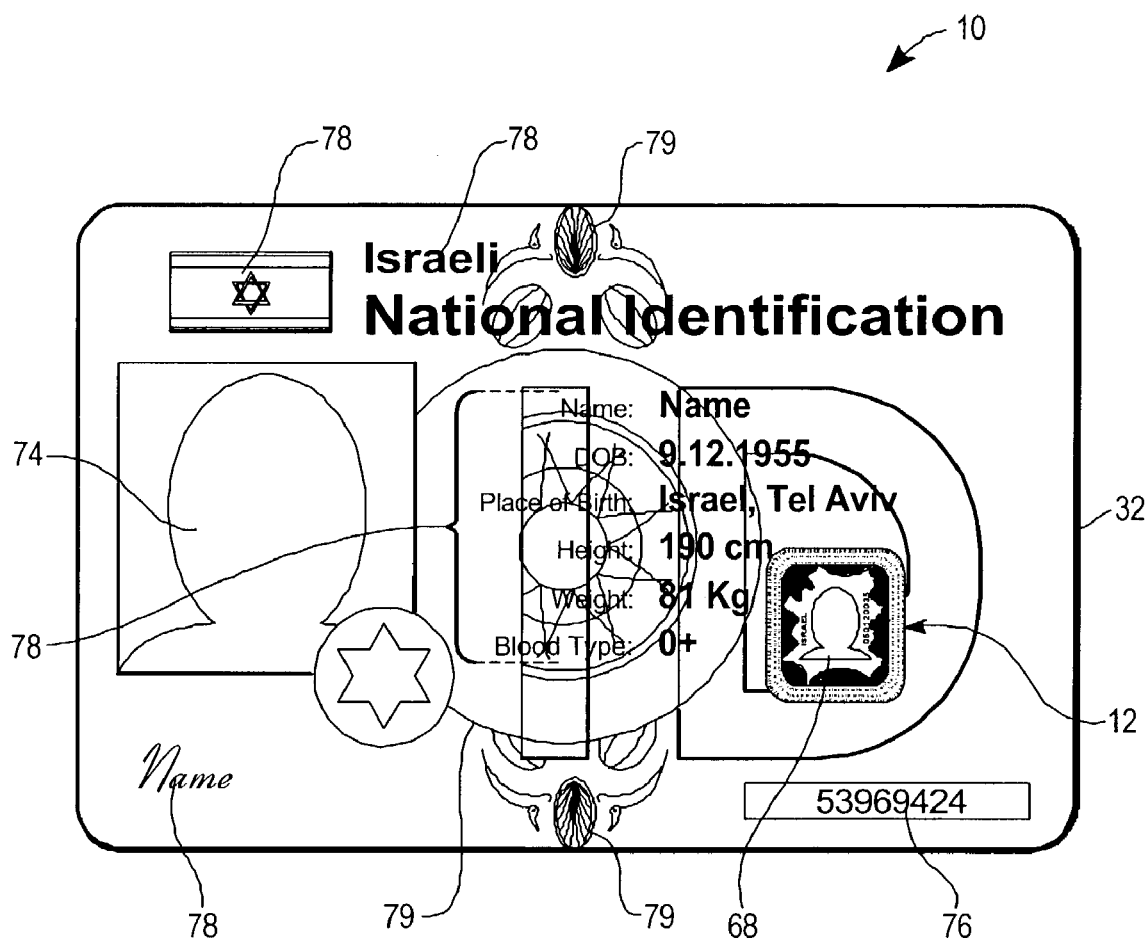
FIG. 1 is a top plan view of an identification card having a personalized optical security chip made in accord with the method of the present invention.

With reference to FIG. 1, a personal optical security card 10 having a personalized optical security chip 12 embedded within the card and made in accord with the method of the present invention, which utilizes known commercial smart card manufacturing equipment of the type used for embedding an integrated circuit chip within a card to produce an personal optical security identification card 10, is seen.

Figure 4:
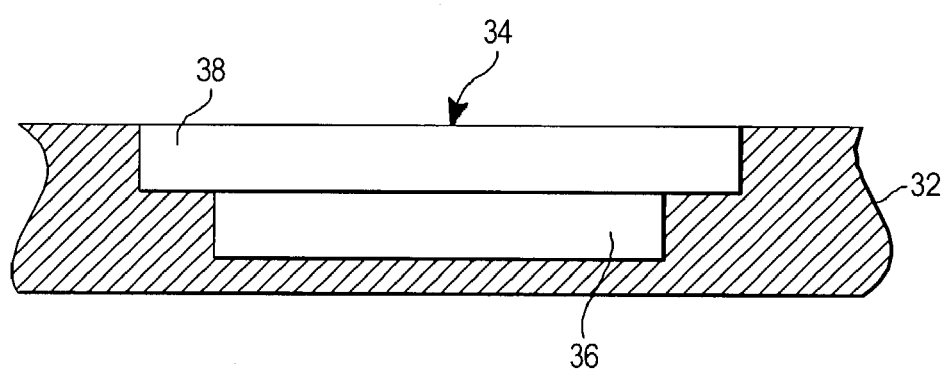
FIG. 4 is a side cross sectional view of a prior art card having a milled cavity.

In brief, the method of the present invention includes formatting an optical security chip area 20 that defines an optical security chip 12 removed from a carrier 14 (FIG. 2), removing the personalized optical security chip 12 from the carrier 14 with equipment known in the art, and embedding the optical security chip 12 within a cavity such as cavity 34 (FIG. 4, based on a figure in Haghiri & Tarantino, Smart Card Manufacturing A Practical Guide, at 59 (2002)) or cavity 18 (FIG. 5) milled within a card body 32 with equipment known in the art. In one embodiment, optical security chip areas are not pre-defined on the carrier 14.

In the present invention, the optical security chip 12 comprises optical material known in the art. Some examples of optical materials are described in U.S. Pat. Nos. 4,680,459; 4,814,594; and 5,421,619, which are hereby incorporated by reference. The optical chip 12 may comprise high resolution laser recording material and may be any of the reflective recording material which have been developed for use as direct read-after-write (DRAW) optical disks, so long as the materials can be formed on thin substrates. An advantage of reflective materials over transmissive materials is that the write equipment is all on one side of the card and automatic focus is easier, and twice as much data can be stored by using both sides. For example, the high-resolution material described in U.S. Pat. No. 4,230,939 issued to de Bont, et al. teaches a thin metallic recording layer of reflective metals such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. Suspensions of reflective metal particles in organic colloids also form low melting temperature laser recording media. Silver is one such metal. Typical recording media are described in U.S. Pat. Nos. 4,314,260; 4,298,684; 4,278,758; 4,278,758; 4,278,756; and 4,269,917, all assigned to the assignee of the present invention.

Figure 2:
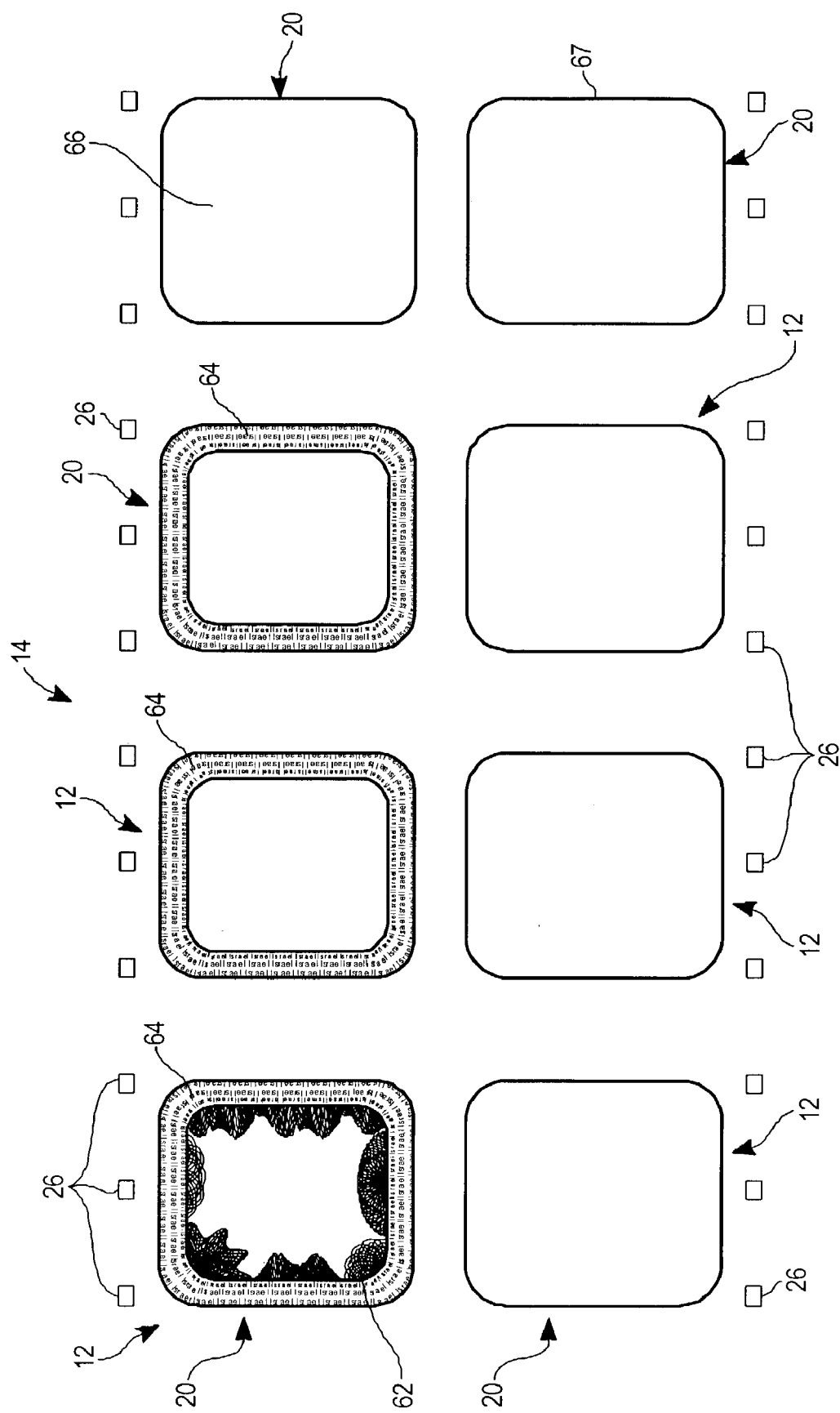
FIG. 2 is a top plan view of a portion of a personalized optical security chip carrier of the present invention.

With reference to FIG. 2, formatting optical security chip areas 20 to be removed from the carrier 14 may occur as follows. In one example, the optical security chip carrier 14 includes a continuous roll stock of optical media. The optical media may have pre-formatted secure optical security chip areas 20 defining the size of the chip 12 to be removed from the carrier. The pre-formatted areas 20 may be delineated by laser recordings such as high-resolution graphical elements 62, text 64, or laser recorded boundaries 67. Alternatively, the optical media may remain blank and a punching tool, described further below, will define the size of the chip 12 that is to be removed by being punched out. Each optical security chip 12 (FIG. 7), removed from the carrier 14 may be the same size as a typical integrated circuit chip 22 (FIG. 3) found on a smart card (not shown), for example, about 1.5 cm by 1 cm at its upper dimension. The optical security chip carrier 14 of the present invention utilizes the same layout and spacing that are used in conjunction with an integrated circuit chip carrier 16 (FIG. 3) used in conjunction with commercial smart card chip embedding manufacturing equipment.

In another example, optical security chips 12 are formatted on the carrier 14 by being mounted onto the carrier 14, which may be made of optical media, a film type media, tape, or other media. The mounted optical security chip 12 defines an optical security chip area 20 on the carrier 14. In the method of the present invention, a chip adhesive (not shown) may be dispensed on the carrier 16, as occurs in the prior art manufacturing of the integrated chip module carrier 24. Other methods known in the art for bonding integrated circuit chip modules 28 to the carrier 24 may also be used to bond optical security chips 12 to the carrier 14. The optical security chips are placed on the points of adhesive located on the carrier 14.

Optical security chips 12 are mounted next to or near each other on optical security chip areas 20 or are defined next to or near each other with recordings or otherwise on optical security chip area 20. For example, optical security chips are disposed in pairs along carrier strip 14 being 35 mm wide and having edge perforations 26 as seen in FIG. 2. A plurality of optical security chips 12 are thus formatted on the carrier by mounting chips on, or by defining chips in, the carrier. Though mounting integrated circuit chips 22 onto a carrier 24 such as tape of film, as seen in FIG. 3, is known in the prior art, mounting optical security chips 14 or defining them on a carrier is not.

Figure 3:
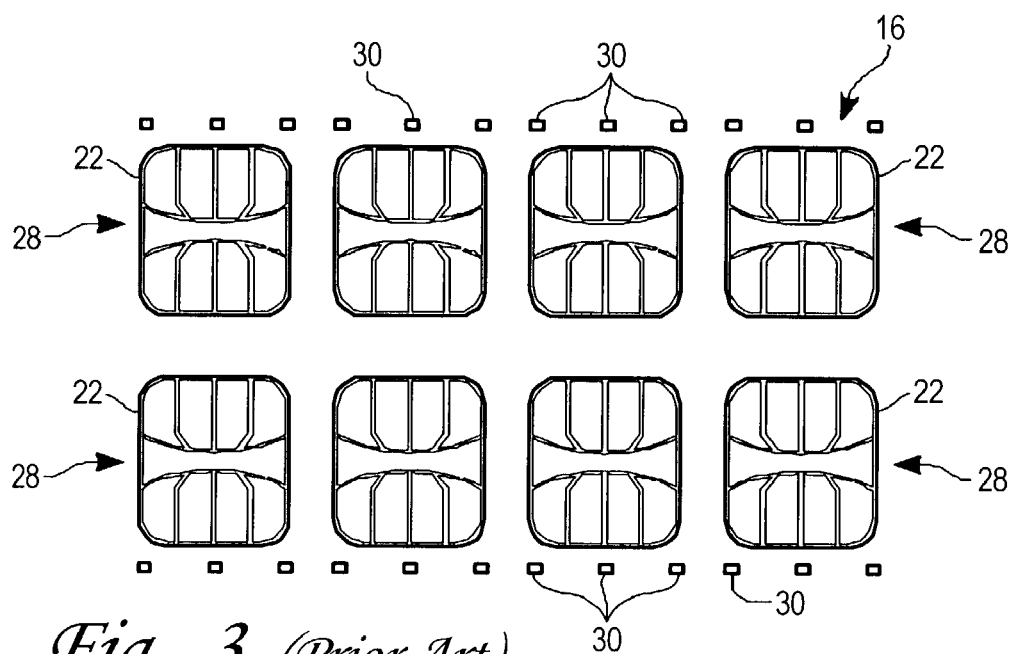
FIG. 3 is a top plan view of a portion of an integrated circuit module carrier known in the art.

With reference to FIG. 3 of the prior art, integrated circuit chips 22 were transformed into modules 28, including chips 22. The modules 28 were mounted next to each other in pairs on the carrier 16. Typically, in the prior art, 35 mm wide carrier 16 was used.

In the present invention, any size of carrier 14 and optical security chip 12 that is compatible with commercial smart card manufacturing equipment known in the art may also be used.

Referring to FIG. 2, perforations 26 punched in the optical security chip carrier 14 are used through following production steps as a point of reference and also to assist in winding the carrier 14 on a reel (not shown), as in the prior art system of smart card manufacture. Perforations 26 are punched on the carrier 14, as perforations 30 (FIG. 3) were punched out on the integrated circuit carrier 16 of the prior art. Typical dimensions of perforations 30 used in the prior art were 1.42 mm×1.42 mm with a typical separation distance of 4.25 mm perforations. Perforations 26 of the present invention may use the same dimensions. Other dimensions of perforations 26 that correspond to existing smart card manufacturing equipment may be also used. The optical security chip carrier 14 is wound on the reel to allow for easy transport and packaging of the modules. In one example, each reel of optical security chip carriers 14 is about 200 meters in length with two parallel rows of optical chips. Such a reel carries about 50,000 optical memory cards per roll of material supplied.

In the prior art, steps required for creating the module 28 (FIG. 3) from the integrated circuit chip 22 and for improving electrical contacts of the integrated circuit chip to the carrier 16 were required. In contrast, the method of manufacturing the optical security carrier 14 and formatted optical security chips 12 of the present invention do not include steps required in the prior art for creating electrical connections of the prior art integrated circuit chips with the carrier and module. Instead, the optical security chip 12 may merely be affixed with adhesive to, or formatted on, the carrier 14. Thus, the optical security carrier 14 with formatted optical security chip areas 20 of the present invention is easier to manufacture than the integrated circuit chip carrier 24 of the prior art having mounted integrated circuit modules 28 of the prior art.

Smart card bodies of the prior art are utilized in the present invention to create personal optical security card bodies 32 of the present invention. Card 32 may be plastic and may, for example, comprise laminated polyvinyl chloride as known in the art. Laminated cards tend to last longer and cost less to manufacture than other types of cards in large quantity runs. In one example of a lamination process known in the art of smart card making, several plastic layers are pressed between two laminating plates in a laminating press. For instance, Bürkle Robert GmbH manufactures a card laminating machine with an automatic sheet feeder. Individual cards are punched out from rows of the laminating sheets with an automated card-punching machine such as one manufactured by the company Mühlbauer AG.

Referring back to FIG. 1, typical optical security card body 32 dimensions are dimensions that are the same as a smart card standard dimensions. Smart card dimensions are typically the same as a credit card. The personal optical security card 10 of the present invention may be larger or smaller, if compatible with known smart card manufacturing equipment.

After card bodies 32 are created, a cavity is milled out of each of the cards with an automated milling machine (not shown) known in the art of smart card manufacturing. The milling machine may have one or two spindles. An example of a card milling machine known in the art is the SCM 5030/6C0 manufactured by Mühlbauer AG. The machine allows mass milling of cards wherein the cards may be supplied and removed in magazines. The height of the milling tool is adjustable, depending upon the size of the cavity needed. The size of the cavity that is milled should correspond to the size of a section that is to be embedded within the cavity and should be at least the same size as the section.

Figure 5:
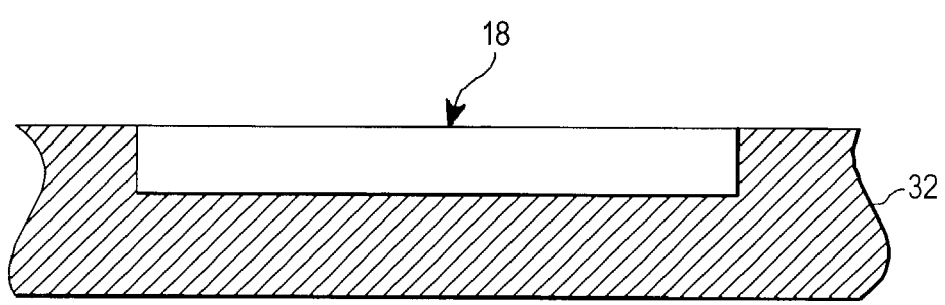
FIG. 5 is a side cross sectional view of a milled cavity sized to receive an optical security chip in accord with the method of the present invention.

With reference to FIG. 4, in one example in the prior art, a cavity 34 had a first lower section 36 with a greater depth and a second upper section 38 with a shorter depth so that an integrated circuit module 28 having similar dimensions could be firmly embedded therein. In the present invention, the optical security chips 12 are, in one example, of a constant depth. Thus, in one embodiment, the optical security chip cavity 18 milled within the card body 32 is also of approximately the same depth and at least the same size as the optical security chip. A cavity having the same depth all around is seen in FIG. 5. Alternatively, the optical security chip 12 of the present invention may be inserted within the second upper section 38 of the integrated circuit module cavity 34 and fixed therein, in which case it may not contact the first lower section 36.

Each optical chip 12, obtained from the plurality of optical security chip areas 20 on the carrier 14 (FIG. 2), is inserted into the pre-milled cavity, such as 18 or 34, in the card body 32, and attached using normal known integrated circuit chip adhesion systems. A smart card manufacturing machine 40 for removing and embedding an integrated circuit chip module from an integrated chip module carrier of the prior art into the cavity of the card 32 is, for example, SCI 8200 manufactured by Mühlbauer AG (FIG. 6 based on a figure from Haghiri & Tarantino, Smart Card Manufacturing A Practical Guide at 145 (2002)). In the method of the present invention, smart card manufacturing machine 40 is utilized to remove the optical security chips 12 from the optical security carrier 14 and to embed each optical security chip 12 into the card cavity, such as 18 or 34. An optical security chip 12 is embedded within each of a plurality of cards 32 with the machine 40, resulting in a plurality of personal optical security cards 10. Other machines known in the art for manufacturing smart cards in an automated manner and that remove an integrated circuit chip from a carrier and embed it in a card cavity may also be used in the present invention to produce an optical security card. The optical security chip carrier 14 of the present invention is of a size that is compatible with the prior art smart card manufacturing machine 40. Additionally, the optical security chips 12 are of a size, as described above, that is within the range of sizes of integrated circuit chips 22 used within the prior art smart card manufacturing machine 40.

Figure 6:
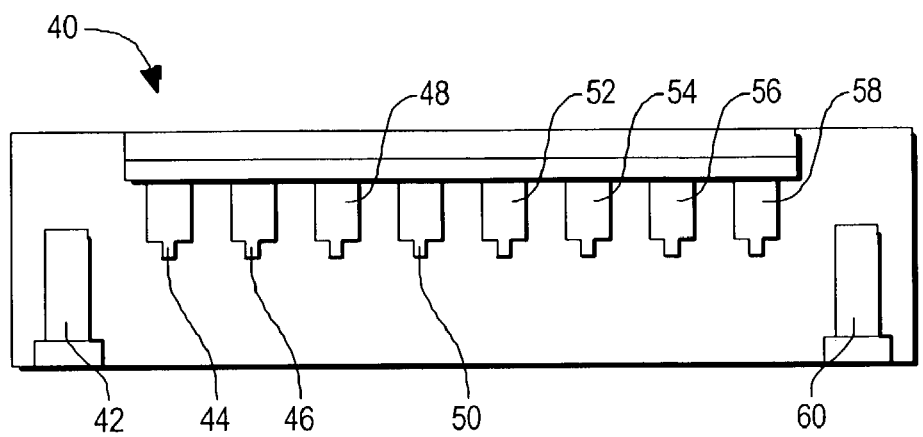
FIG. 6 is a plan partial view of a smart card manufacturing machine known in the prior art.

The smart card manufacturing machine 40, for instance the SCI 8200 manufactured by Mühlbauer AG, includes various processing stations. Referring to FIG. 6, the optical security chip carrier 14 with optical security chip areas 20 is loaded onto the machine 40 and the cards 32 are fed onto the machine 40 at a card feeder 42. A sensor 44 detects whether a cavity exists in the card 32 after each card is fed to the machine 40. Adhesion applications may include, for instance, use of an adhesive liquid or tape or other adhesion systems known in the art. In this example, adhesive liquid is dispensed from a liquid dispensing station 46 into the card cavity, such as 18 or 34 (FIGS. 4 and 5). A few drops of adhesive (not shown) may be applied on the inner periphery of the cavity and within the center of the cavity, such as cavity 18 or 34. The adhesive may be maintained at a special temperature to prevent it from drying out. The optical security chip 12 is removed or punched out of the carrier 14 and placed within the cavity having adhesive at fixing station 48. A chip module punching tool (not shown) is disposed on machine 40. In the prior art, an integrated circuit chip module 28 was punched out from the carrier 24 with the chip module punching tool at the side of the encapsulation of the chip to avoid damage to the chip module 28. Here, however, it is less likely that damage will occur to the optical security chip 12 as the optical security chip 12 lacks the electrical connections of the integrated circuit chip module 28. Therefore, the punching tool may punch the optical security chip 12 out from a variety of sides. As is known in the art, the punching tool has a cavity at least the same size as the integrated circuit module 28. Thus, in the method of the present invention the cavity is at least the same size as the optical security chip 12. In one embodiment of the present invention, the carrier 14 includes blank portions without optical chip areas 20. The punching tool punches areas from the carrier 14 that become chips 12. Thus, the punching tool defines the size of the optical security chip 12. Such an embodiment simplifies defining the size of optical chip 12. Removal or punching of the optical security chip 12 may occur through other systems known in the art of smart card manufacture.

A suction pipette, (not shown) transfers the punched optical security chip 12 to the fixing station 48 of the smart card manufacturing machine at which the optical security chip 12 is placed in the cavity 18 or 34. The optical security chip is fixed to the cavity by first being attached to the cavity briefly with a heated metal stamp (not shown) at heating station 50 and then the optical security chip 12 is pressed within the cavity using a welded heat stamp (not shown) at heating station 52. The optical security chip is then cooled with a cooling stamp (not shown) at cooling station 54. Optical and electrical checks may occur, at optical check station 56 and electrical check station 58. However, as the optical security chip 12 is not an electrical device, as was the integrated circuit module 28 used in the prior art in conjunction with machine 40, these checks may be bypassed. At feeder station 60, the completed card is fed outside of the machine.

The process of embedding the optical security chip 12 in the card body 32 may run in parallel to the process of card body 32 production. Also, the optical security chip carrier 14 and optical security chips 12 may be formatted or modified accordingly to be compatible with other smart card manufacturing equipment known in the art that utilize carriers for automated production of smart cards.

The present invention is advantageous in that it allows the automated manufacture of many personal optical security cards 10 using normal commercially available smart card facilities, and allows the insertion of optical security chip 12 into any normal plastic blank cards 32. This eliminates the need for a custom made optical card body to contain the optical security chip.

The personal optical security chip 12 may be personalized with recordings made on the chip before or after embedding the chip within the card body 32. Referring to FIG. 2, it is seen that before the optical security chip 12 is embedded within the card body 32, recordings may be made on it. The chips 12 bound to or formatted on the carrier 14 may include high-resolution graphical patterns 62 implemented at graphic resolutions beyond the means of normal printing techniques and/or laser recorded text 64. Such graphical patterns and text may also be added after the chip 12 has been embedded within the card body 32, if desired. Alternatively, the optical memory chip 12 may remain blank 66, unless a user decides to engrave the chip with information upon receipt of the optical security chip.

Figure 7:
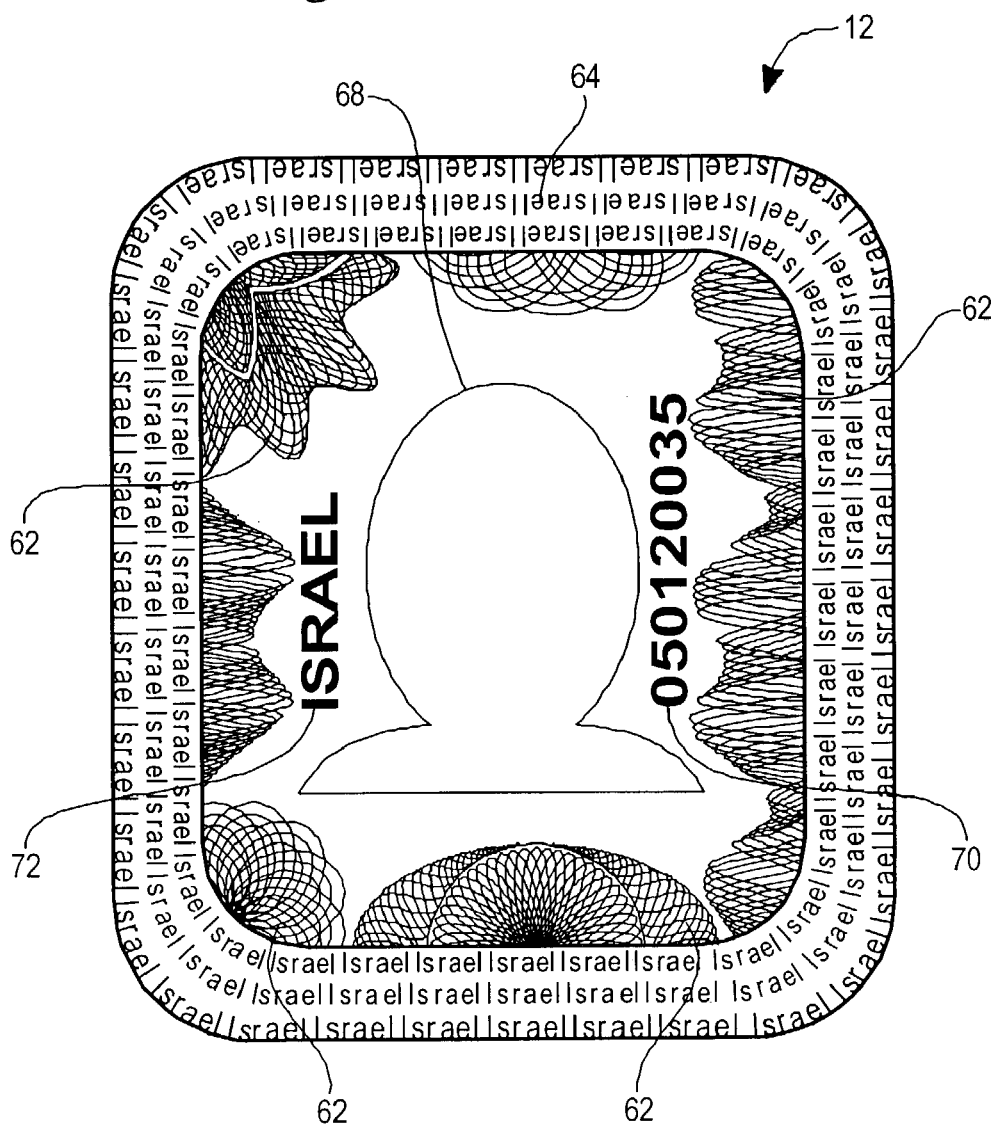
FIG. 7 is a magnified view the personalized optical security chip of FIG. 1.

With reference to FIGS. 1 and 7, the personal optical security chip 12 contains reference marks (not shown) to allow the use of modified optical card reader/writer systems to write an embedded hologram 68 within an optical window or available media of the chip 12. The hologram 68 may comprise an image of the card user as shown. The photograph may be framed by the surrounding security graphical elements 62 and text 64.

Further, laser recorded personalized data such as eye readable text including a serial number 70 and cardholder identification information 72, and/or machine readable data such as digital data (not shown) may be laser engraved within the optical medium of the optical security chip 12 before or after embedding the chip 12 within the card body 32.

The personalized data may be recorded by laser using 1 to 10 micron pits inside the optical window. The personalized data may be interlinked with surrounding high resolution graphical patterns 62 or text 64, making the personalization feature difficult to duplicate diffractive characteristics. This helps to lock together all the elements on the card body 32. Data recordation is known in the art and is described in U.S. Pat. Nos. 4,680,459 and 4,814,594 assigned to the assignee of the present invention, which are hereby incorporated by reference.

In addition to recording graphical elements and/or personalized data on the optical security chip 12, graphical elements and/or data may be recorded on the card body 32 itself. The card may include regions suitable for the recording of digital and/or eye readable data. A hologram 74, such as one in the image of the user may be generated on the card 32 in the plastic overlay materials, as seen in FIG. 1. Further, laser information such as an eye readable serial number 76, cardholder identification information 78, machine readable digital data (not shown), as well as additional markings 79, may be laser engraved within the optical medium of the card using methods known in the art. Such recordings may be made before or after the optical security chip 12 has been embedded within the card body 32.

The card may support insertion of an integrated circuit chip 22 or chip module 28 within the card 32, in addition to supporting insertion of the optical security chip 12. Commercial equipment known in the prior art is used to insert the integrated circuit chip within the card. For example, machine 40, seen in FIG. 6, may be used. Two cavities (not shown) are milled within the cards 32. A first cavity is formatted to receive an integrated circuit chip module 28 and a second cavity is formatted to receive an optical security chip 12. Cards may be fed into the punching/embedding machine 40 twice. In one of the machine runs, the carrier used in the machine 40 includes the optical security chip carrier 14 (FIG. 2) and in another of the runs the carrier used includes the integrated circuit chip carrier 16 (FIG. 3).

For cards having integrated chips, the overall card security can be enhanced by adding the integrated circuit chip identification numbers into the visible and/or machine readable portions of the card or optical security chip 12, thus protecting the card against integrated circuit chip module swapping.

Recording of personalized information on the optical security card of the present invention decreases the possibility of fraudulently manipulating, altering, or duplicating the card.

The invention claimed is:

1. A method for embedding an optical security chip within a card comprising:
   providing a carrier of an optical medium, said carrier compatible with an integrated circuit card manufacturing machine;
   formatting an optical security chip area on the optical medium on said carrier;
   loading said carrier onto said integrated circuit card manufacturing machine;
   removing an optical security chip from said optical security chip area with said integrated circuit card manufacturing machine;
   providing a card having a milled cavity; and
   embedding said optical security chip in said cavity with said integrated circuit card manufacturing machine.

2. The method of claim 1 wherein removing said optical security chip occurs by punching out said optical security chip from said optical security chip area.

3. The method of claim 1 wherein formatting an optical security chip area includes defining a chip size on said carrier.

4. The method of claim 1 wherein formatting said optical security chip area on said carrier includes bonding an optical security chip to said carrier.

5. The method of claim 1 wherein said carrier is an optical medium.

6. The method of claim 5 wherein formatting said optical security chip area includes defining said optical security chip area with a recording on said carrier.

7. The method of claim 6 wherein said recording is graphical.

8. The method of claim 6 wherein said recording includes text.

9. The method of claim 6 wherein at least two chip areas are formatted and said chip areas are disposed side by side along a length of such carrier.

10. The method of claim 1 wherein said optical security chip has the same length and width as an integrated circuit chip.

11. The method of claim 1 wherein said optical memory chips are compatible with said integrated circuit card manufacturing machine.

12. The method of claim 1 further comprising applying adhesive to said cavity before embedding said punched out optical security chip in said cavity.

13. The method of claim 1 wherein said carrier is film.

14. The method of claim 1 wherein said optical chip is approximately 1.5 cm×1 cm.

15. The method of claim 1 wherein said carrier is 35 mm wide.

16. The method of claim 1 wherein formatting optical chip areas on said carrier includes supplying two optical chips side by side along a length of said carrier.

17. The method of claim 1 further comprising recording optical data on said optical security chip before embedding said chip within said cavity.

18. The method of claim 1 further comprising recording optical data on said optical security chip after embedding said chip within said cavity.

19. The method of claim 1 further comprising providing reference marks on said optical security chip.

20. The method of claim 1 further comprising writing an embedded hologram within said optical security chip.

21. The method of claim 1 further comprising recording data within said optical security chip and recording graphical data within said security chip and interlinking said data.

22. The method of claim 21 wherein said data includes text.

23. The method of claim 1 further comprising recording data on said card before embedding said chip within said cavity.

24. The method of claim 1 further comprising recording optical data on said card after embedding said chip within said cavity.

25. The method of claim 1 further comprising milling a second cavity in said card, removing an integrated circuit chip from an integrated circuit chip carrier with said integrated circuit card manufacturing machine and embedding said integrated circuit chip within said second cavity with said integrated circuit card manufacturing machine.

26. The method of claim 1 wherein said cavity includes a constant depth.

* * * * *